F. L. EBERHARDT & W. F. ZIMMERMANN.
GEAR ROUGHING MACHINE.
APPLICATION FILED AUG. 22, 1910.
1,047,926.
Patented Dec. 24, 1912.
2 SHEETS—SHEET 2.
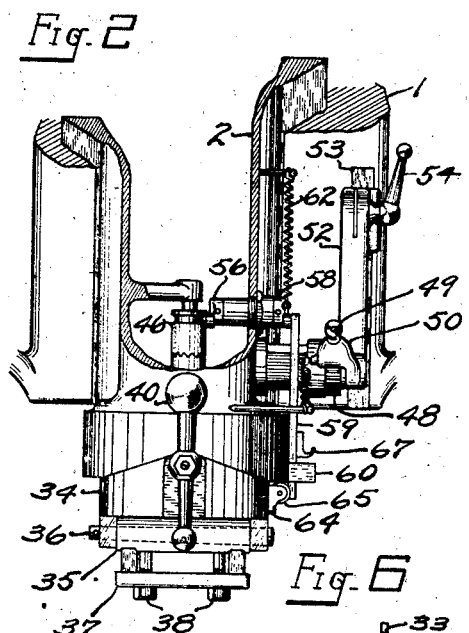
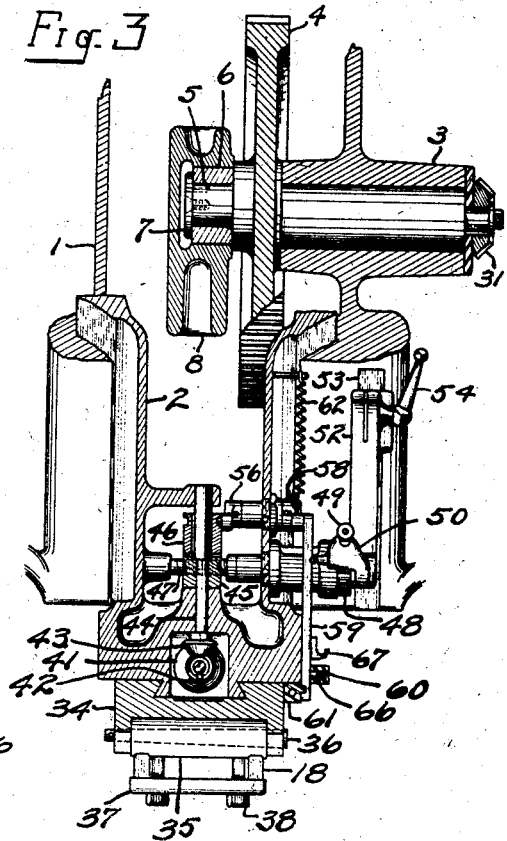
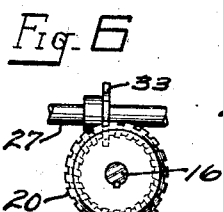
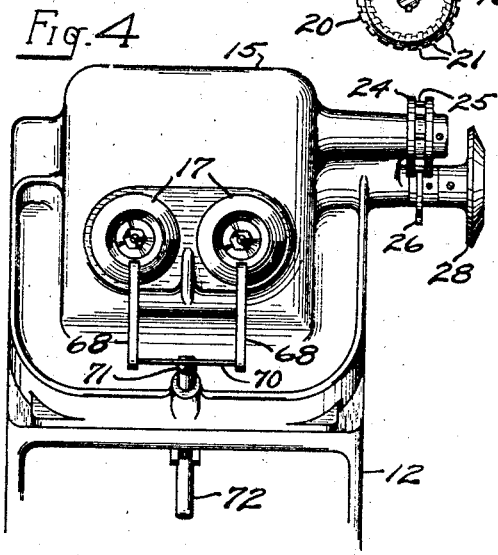
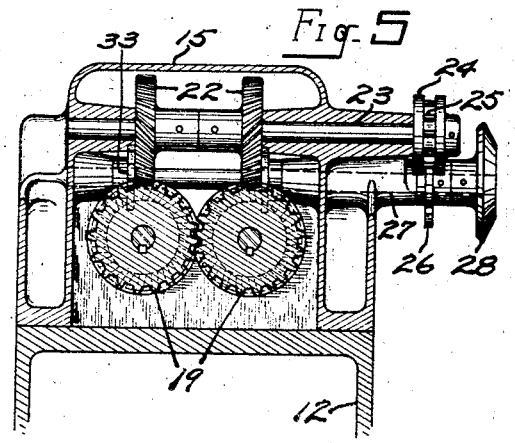
WITNESSES_
B. E. Barnes.
H. W. Jacobson
INVENTORS_
Frederick L. Eberhardt.
and
William F. Zimmermann.
BY Wm F Zimmermann
ATTORNEY_

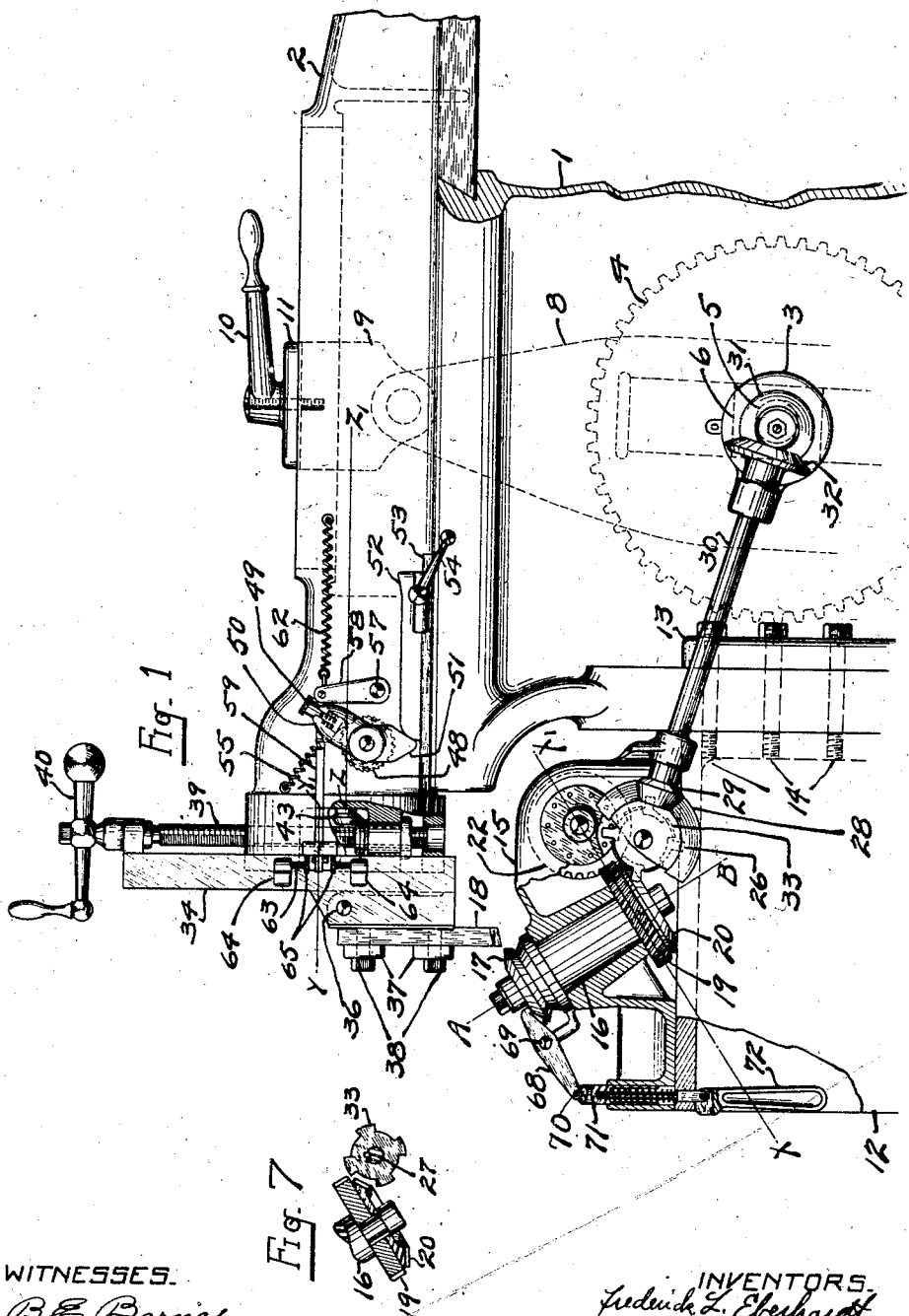

UNITED STATES PATENT OFFICE.

FREDERICK L. EBERHARDT AND WILLIAM F. ZIMMERMANN, OF NEWARK, NEW JERSEY, ASSIGNORS TO GOULD & EBERHARDT, OF NEWARK, NEW JERSEY, A CORPORATION OF NEW JERSEY.

GEAR-ROUGHING MACHINE.

1,047,926.  Specification of Letters Patent.  Patented Dec. 24, 1912.

Application filed August 22, 1910. Serial No. 578,403.

*To all whom it may concern:*

Be it known that we, FREDERICK L. EBERHARDT and WILLIAM F. ZIMMERMANN, citizens of the United States, and residents of the city of Newark, in the county of Essex and State of New Jersey, have invented certain new and useful Improvements in Gear-Roughing Machines; and we do hereby declare the following specification, taken in connection with the drawings forming part of the same, to be a full, clear, and exact description of the principle of said invention and the best mode in which we have contemplated applying that principle, so as to distinguish it from other inventions.

The invention relates primarily to a shaping machine arranged to rapidly rough out spur and bevel gears preparatory to finishing them on a generating machine and more particularly to a machine arranged to rapidly rough out bevel gears provided with a hub projecting toward the apex of the gear, but is not limited to such a gear.

The primary object of this invention is to provide an automatic arrangement in combination with parts of a shaping machine, to rapidly rough out the spaces in automobile bevel gears, particularly those which cannot be cut with a rotary cutter and which have a hub projecting beyond the face of the gear toward the apex thereof.

Heretofore, the gears with projecting hubs were roughed out on an expensive generating machine. These machines being generators and of a very complicated construction, considerably retarded the quantity of gears produced thereby in any given time. The present construction is a simple and rigid device, stripped of all unnecessary complications and only arranged to rough out the gears and not to form the contour thereof. The simplicity and rigidity of the present device has enabled the roughing out of gears to be accomplished in about one fourth to one fifth of the time heretofore consumed; not only has the time of production been materially reduced, but the cost of the device has been practically lowered to one half of that of a generator.

Another feature relates to the automatic indexing device and locking arrangement for the gear blank, whereby the gears are spaced after each cut and locked in position during the cut.

Another feature relates to the automatic feeding device for the cutting tool, whereby the tool is fed to the proper depth of tooth and then automatically disconnected at a predetermined time, said feed being intermittent and taking place at each return stroke of the cutting tool.

Still another feature relates to the chip cleaning device whereby the chips, which crowd in the groove between the teeth and hub of the gear, are cleared away to prevent the jamming of the tool against these chips and consequently causing the stoppage of the entire device, due to a practically solid abutment being interposed between the hub of the gear and the cutting tool.

The invention comprises a reciprocating tool, a work holder, a means to index said work holder after each cutting movement of said tool, a means to lock said work holder during the cutting movement, a means to feed said tool after each cutting movement, an automatic stop therefor to disengage said feed at a predetermined time, and a chip cleaning device to prevent the crowding of chips between the work and tool.

The annexed drawings and the following description set forth in detail, certain mechanism embodying means constituting however, but one of the various mechanical forms in which the principle of the invention may be used.

The novelty of the invention will be readily understood from the drawings, which show so much of a shaping machine as to properly illustrate the invention in its preferred form, when applied thereto, and from the following description thereof.

The novelty of the invention is more particularly pointed out in the claims annexed to said description.

Referring to the drawings: Figure 1, is a side elevation of a shaping machine with the work support and cutting tool feed device partly in section. Fig. 2, is a plan view of the cutting tool slide or ram partly in section, to show the feed mechanism for the tools. Fig. 3 is a sectional view of the tool slide at Y Y₁ and Z Z₁ of Fig. 1 and also illustrates the reciprocating mechanism for the tool slide partly in section. Fig. 4 is a plan view of the work support, looking in the direction of the work spindle axes A, B of Fig. 1. Fig. 5 is a sectional view of the work support at X X₁ of Fig. 1. Fig. 6, is a plan view of the locking device for the work spindle and Fig. 7 is a side sectional view of said work spindle locking device.

Referring now particularly to Fig. 1, the frame, 1 is provided with angular ways for the reciprocating tool slide 2 and is also arranged with a bearing 3 (see Fig. 3) in which a driving or bull gear 4 is rotatably mounted. The gear 4 is provided with a crank pin 5 set sufficiently off center to give the tool slide 2 the proper length of stroke. A square crank pin block 6 is mounted on said crank pin 5 and held thereto by the flange 7 and arranged to operate in the lever 8. Said lever 8 is hinged in the usual way to a lever block 9 clamped to the tool slide 2 by means of the handle 10 and cap 11. The parts thus described are characteristic of the familiar crank shaping machine and consequently various unimportant details have been omitted.

A knee or table 12, which is secured to the front end of the frame 1 by the strap 13 and screws 14, has a work support 15 secured thereon, in which two revoluble work spindles 16 are mounted to carry the gear blanks 17. The work spindles 16 are arranged at an angle, in said work support 15, sufficient to bring the cutting angle of the gear blanks 17 parallel to the path of the cutting tools 18. A helical gear 19 is secured to the lower end of each of said work spindles 16 together with a locking plate 20, the latter being provided with a series of slots 21, arranged slightly off center and of a number corresponding with the number of teeth to be cut in the gear blanks 17.

The helical gears 19 are driven by individual helical pinions 22 secured to the indexing shaft 23, which is rotatably mounted in the work support 15 (see Fig. 5). A lantern gear 24 is secured to one end of the indexing shaft 23 and provided with a number of rungs or pins 25, equal to, or a factor of the number of slots in the locking plate 20. In the particular arrangement as shown, the number of rungs is equal to one half of the number of slots in the plate 20. The lantern gear 24 is intermittently engaged by each of the lobes on the lobed wheel 26 to index the work spindles 16 intermittently between the successive cutting strokes of the tools 18.

The four-lobed wheel 26 is rotated continuously by the locking shaft 27, which receives its motion through the bevel gear 28 secured thereto and rotated by the bevel pinion 29 secured to the driving shaft 30. A bevel pinion 31 is secured to, and rotates with the bull wheel 4 and engages with a bevel gear 32, secured to and rotating said driving shaft 30. The connections between the bull-wheel 4 and the work spindles 16 are arranged to maintain the synchronism between the relative movements of the reciprocating tools 18 and gear blanks 17.

Two locking members 33 are secured to the locking shaft 27 and provided with a series of lobes corresponding in number to those on the lobed wheel 26. The lobes on the locking members 33 are arranged to engage the slots 21 in the locking plate 20, to prevent the work spindles 16 from rotating during the cutting action of the tools, and are disengaged from the plate during the indexing movement.

The ram 2 is provided at one end thereof, with an adjustable tool slide 34, in which the clapper 35 is pivoted at 36. The tools 18 are secured to the clapper 35 by the straps 37 and bolts 38. The tool slide 34, carrying the tools 18, is adjusted vertically by means of a screw 39 operated by the handle 40. The screw 39 extends through the round end of the ram 2 and is fitted to a tapped portion therein. The tools are also adjusted or fed automatically by a power feed arrangement provided to intermittently feed the tools in a downward direction during the return or non-cutting movement of said tools. This power feed device consists of a bevel gear 41 mounted in the ram 2 and arranged to allow the screw 39 to pass through an opening therein. A driving connection is maintained between the screw 39 and gear 41, by the engagement of the key 42, secured to said gear with a spline in the screw. The bevel gear 41 engages with and is rotated by a bevel pinion 43 secured to the feed shaft 44. The feed shaft 44 is mounted in the ram at right angles to the screw 39 and is provided with a worm wheel 45 loosely mounted therein, so arranged as to be engaged by the sliding clutch 46, also mounted on said feed shaft 44, but keyed thereto. The worm wheel 45 is rotated by the worm 47 mounted transversely in the ram 2 and having a ratchet gear 48 secured to the outer end thereof. A rocking lever 50 is loosely mounted on the worm shaft 47, and adjacent to the ratchet gear 48, and is provided with a ratchet pawl 49 therein, to engage said ratchet gear 48.

The lower end 51 of the rocking lever 50, is arranged to come in contact with the sliding abutment 52 which is adjustable on a guideway 53 secured to the frame 1. A screw handle 54 clamps the sliding abutment 52 to its guideway 53. A spring 55 is secured to the rocking lever 50 and the ram 2 to insure the return movement of said lever 51, after having been rocked by the engagement thereof with the abutment 52.

Means for disengaging the feed of the tools 18 is also provided and comprises a lever 56 secured to a shaft 57 arranged to rock in the ram 2, and engaging the peripheral groove in the clutch 46. A lever 58 is secured to the outer end of said rock shaft 57 and has a trip bar or hook 59 attached to one end thereof. This trip bar or hook 59 is guided at its other end by the block 60 and is provided with a recess or hook to engage the adjustable block 61. The lever 58 is constantly forced in one direction, by the spring 62 attached thereto, to disengage the feed clutches and discontinue the automatic tool feed, but this spring can only act when the hook 59 is free from the block 61. The adjustable block 61 is mounted on the screw 63, held at each end in the bearings 64. Two adjusting nuts 65 are provided on the screw 63 and on each side of the adjustable block 61 to adjust said block 61 for the proper depth of tooth to be cut in the gear and to lock same in such adjusted position. A spring 66 arranged in the guide block 60 is provided to press the hook 59 into engagement with the adjustable block 61 and still allow the said hook to be engaged or disengaged manually by a lateral movement toward or away from said block by means of the handle 67 provided on said hook.

A device to clean the chips from out of the groove formed between the projecting hub of the gear and the teeth, is provided so as to prevent the chips from forming a solid abutment in the path of the cutting tools and thereby impair the operation of the entire device.

Each gear blank to be cut is provided with a chip lever 68 fulcrumed at 69 and one end thereof arranged to fit the groove in the gear blank against which the chips are pressed and then directed into the chip pan. The other ends of the chip levers 68 are connected by a rod 70 which is forced upwardly by a spring pressed plunger 71 so as to press the chip cleaning into the gear groove. A handle 72 is attached to the spring pressed plunger 71 whereby the tension on the chip levers 68 may be released and said levers swing out of the groove in the gear blank and allow said blanks to be removed. This feature is very essential to the succesful operation of the machine so as to prevent the tools from jamming against the hub of the gear by reason of the chips having been blocked between said hub and tools.

Having described the invention in detail, the operation thereof will now be described.

The gear blanks are secured to the spindles and the tools adjusted for the proper length of stroke. The tools are then fed by the hand wheel until they just touch the uppermost portion of the gear face. The adjustable block is then set for the proper depth and the automatic feed engaged and the chip cleaners put in position. As the tools move forward for the cut, the spindles are locked by the cam 33 and on the rearward or non-cutting stroke they are unlocked and indexed one space by the cam 26. This is repeated at each stroke. As the tools reach their rearward position, the ratchet lever 51 strikes the abutment 52 and feeds the tools deeper into the work and at each stroke until the adjustable block has been moved sufficiently to release the hook or trip bar and has allowed the feed to be disconnected by the spring 62, whereupon the tools are raised manually and new gear blanks substituted.

Having described our invention and its mode of operation we claim as new and desire to secure by Letters Patent:

1. The combination with a tool, of means to reciprocate same, a work holder, an index shaft connected to said work holder, a locking shaft synchronically connected to said reciprocating mechanism, a lantern gear secured to and rotatable with said index shaft, a multi-lobed cam secured to and rotatable with said locking shaft to intermittently rotate said lantern gear to index said work holder, and a locking connection between said locking shaft and work holder to securely lock the latter during the non-indexing interval.

2. The combination with a tool, of means to reciprocate same, a work holder, an index shaft connected to said work holder, a locking shaft synchronically connected to said reciprocating mechanism, an intermittently operable indexing mechanism between said index and locking shafts to index said work holder and a locking device to lock said work holder during the non-indexing interval comprising a notched plate secured to said work holder and a multi-lobed locking plate secured to and rotating with said locking shaft.

3. The combination with a tool of means to reciprocate same, a work holder, an index shaft connected to said work holder, a locking shaft rotatably connected to said reciprocating mechanism, a lantern gear secured to and rotatable with said indexing shaft, a multi-lobed cam secured to and rotatable with said locking shaft to intermittently rotate said lantern gear to index said work holder, and a locking device comprising a notched plate secured to said work holder and a multi-lobed locking plate secured to and rotating with said locking shaft to lock said work holder between the intermittent rotations of said index shaft.

FREDERICK L. EBERHARDT.
WILLIAM F. ZIMMERMANN.

Witnesses:
A. EZRA EBERHARDT,
HUGO W. JACOBSON.